United States Patent [19]

Frings et al.

[11] 3,769,860
[45] Nov. 6, 1973

[54] WRENCH, ESPECIALLY TORQUE WRENCH
[75] Inventors: Horst Frings, Schmiden; Günter Braun, Berg; Ernst Mösle, both of Friedrichshafen; Ludwig Schmid, Friedrichshafen, all of Germany
[73] Assignee: Daimler-Benz Aktiengesellschaft, Stuttgart-Unterturkheim, Germany
[22] Filed: Apr. 22, 1971
[21] Appl. No.: 136,471

[52] U.S. Cl. ................................. 81/52.5
[51] Int. Cl. .................................... B25b
[58] Field of Search ..................... 81/52.5

[56] References Cited
UNITED STATES PATENTS
2,679,777  6/1954  Muth ................................. 81/52.5
FOREIGN PATENTS OR APPLICATIONS
1,002,697  2/1957  Germany ......................... 81/52.5
1,307,374  9/1962  France .............................. 81/52.5

*Primary Examiner*—James L. Jones, Jr.
*Attorney*—Craig, Antonelli & Hill

[57]  ABSTRACT

A wrench, especially a torque wrench, for tightening highly stressed nuts, bolts and the like, in which a torque-measuring device and an angular rotation measuring device are provided, which include transmitting elements secured at these devices; the transmitting elements are movable preferably parallel to one another and in the same direction upon actuation of the wrench with increasing torque and increasing angular rotation in the screw-tightening direction whereby the transmitting elements are connected with each other by way of an intermediate element which locks a release mechanism during relative movements of the transmitting elements in one direction of rotation and initiates a signal upon reversal of the direction of rotation by way of the release mechanism.

39 Claims, 7 Drawing Figures

PATENTED NOV 6 1973 3,769,860

INVENTORS
HORST FRINGS
GÜNTER BRAUN
ERNST MOSLER
LUDWIG SCHMID

BY Craig, Antonelli & Hill

ATTORNEYS

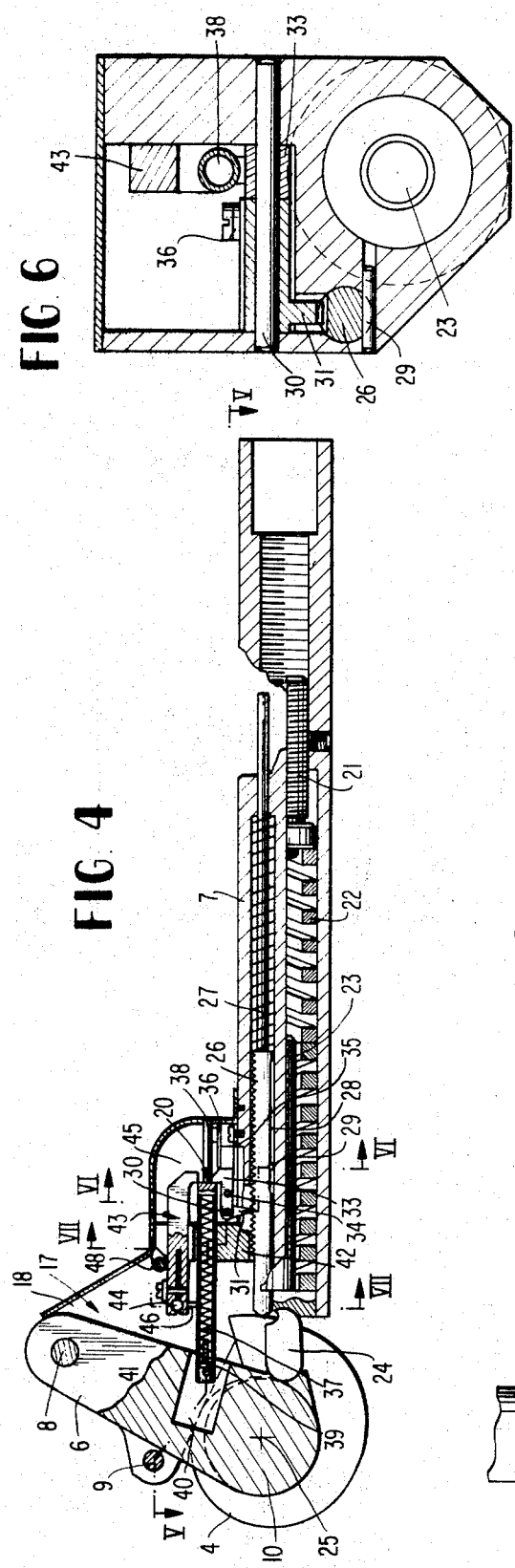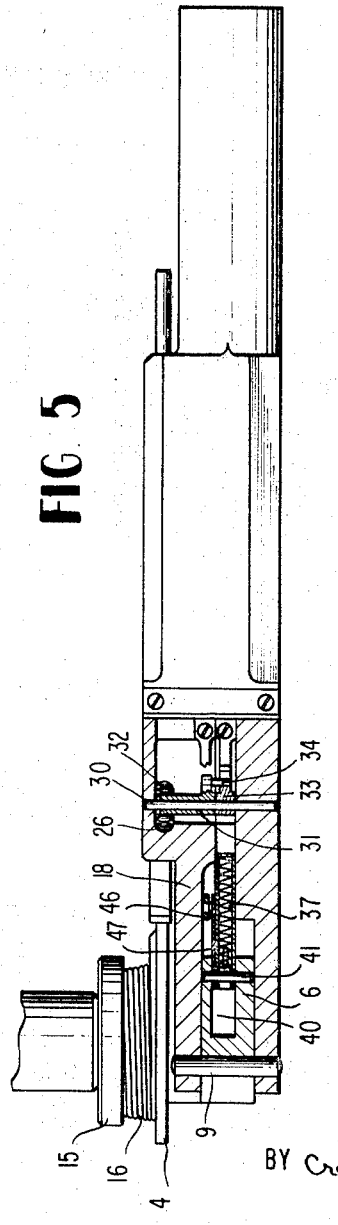

3,769,860

WRENCH, ESPECIALLY TORQUE WRENCH

The present invention relates to a wrench, especially a torque wrench, for tightening highly stressed necked-down bolts, nuts, bolts and/or the like.

These so-called torque wrenches serve to tighten up to the yield point, for example, necked-down bolts, of highly stressed engine parts, that are exposed to high temperature fluctuations or mechanical vibrations. A safe connection of the machine parts under all operating conditions is thereby assured by the optimum pre-stress force with smallest screw diameter.

Torque wrenches of the aforementioned type of tightening screws or bolts into the yield range are known already in the prior art. They can be applied advantageously if the beginning of the yield point of a screw can be easily determined. This is the case if both ends of the screw or bolt are accessible or if the free end of a stud bolt is accessible. The previously calculated or tested strain or plastic deformation can be measured thereby. However, it is more difficult to tighten a cap screw in a blind-end bore up to into the yield range. It is therefore customary to tighten such screws or bolts with known torque wrenches with the aid of a predetermined torque up to a point below the beginning of yield or plastic deformation of the screw determined by comparative tests and then to continue to rotate through a predetermined angle, for example, 90° with simultaneous control of the torque.

The tightening of the screws with the aid of the known torque wrenches entails several disadvantages. At the outset, the mechanic has to observe different tightening instructions with different screws or bolts of differing thread diameter, pitch and screw length since the attaining of the yield point is decisively influenced by the geometric dimensions of the screw thread and of the material. Additionally, only comparative values from prior tests can be utilized as the basis for the torques to be applied in individual cases so that it is not to be excluded that with one bolt the yield point is reached earlier or later than with other bolts of the same type. Additionally, the predetermined angles through which one is to continue to rotate, involve empirical values so that the yield point is not reached uniformly with all tightened screws or bolts, but instead numerous deviations occur which leads to a non-uniform connection of the machine parts and possibly to undesirable permanent deformation of the bolts.

The tightening of the bolts with the known torque wrenches up to into the yield range is time-comsuming and costly since different devices have to be used for the tightening of the bolts. Additionally, the mechanic is overloaded if, for example, for the tightening of a connecting rod bolt, he is to apply a torque of about 40 mkp and, if he has to further observe during as uniform as possible a continued rotation of the torque wrench, when the increase of the torque stops on the scale rotating along, i.e., when the yield limit of the bolt is reached. A further disadvantage of the known torque wrenches resides in the fact that the already tightened bolts or any not-yet tightened bolt are not indicated by the torque wrench so that the danger exists that a bolt has not been tightened or tightened only inadequately and secure a connection of the machine parts is not attained.

The present invention is concerned with the task to eliminate the aforementioned shortcomings and to provide a torque wrench, with the aid of which highly stressed screws or bolts can be tightened optimum in a simple manner up to the yield points so that a safe connection of the engine parts is assured without requiring the mechanic to observe different instructions during the tightening of different types of bolts.

The present invention essentially consists in that at the screw spanner or torque wrench, a torque-measuring device and an angular rotation measuring device are provided with transmitting elements secured at these devices which upon actuation of the spanner or wrench with increasing torque and increasing angle of rotation are adapted to be moved in the same direction, preferably parallel to one another, in the screw-tightening direction, and in that the transmitting elements are operatively connected by means of an intermediate element rotatably supported in the wrench housing, which locks a release mechanism by the relative movement of the transmitting elements in one direction of rotation and which releases a signal by way of the release mechanism in case of a reversal in the direction of rotation. The socket wrench according to the present invention determines directly and automatically by means of this construction the beginning of the yield point of the bolt and the release mechanism may produce, for example, an acoustic or optical signal. The mechanic tightening of the bolt, then only has to apply a correspondingly large torque, and no specific instructions have to be observed with different types of bolts, so that an error in reading off any measurement values is eliminated. The mechanic also does not have to carry out any additional control, for example, a measurement of the maximum torque in order to determine whether the bolt is seated possibly against the thread bottom since the bolt then becomes fast without a release on the part of the wrench.

According to one advantageous embodiment of the present invention, the transmission ratio of the transmission elements can be so selected that upon actuation of the socket wrench, the angular rotation transmitting element takes over the torque-transmitting element only when the yield point of the bolt or the like has been reached, i.e., when the torque increase stops completely or nearly completely. In order to prevent a false or erroneous release, for example, when the wrench has to be transferred from one bolt to another bolt, it may be appropriate if a further locking device is provided for the release mechanism which is connected by connecting elements with those parts, against which the torque-measuring spring supports itself, and that the locking device opens when the prestressed torque-measuring spring spring-deflects inwardly and closes when the torque-measuring spring spring-deflects outwardly. Advantageously, the locking device can be constructed as lever which is adapted to be actuated from a shaft by way of a slip clutch and whose opening angle is limited by an abutment to the smallest possible extent necessary for the release of the release mechanism.

According to a further advantageous feature of the present invention, a bolt prestressed by means of a spring may be provided as release mechanism which is secured in the stressed position by the intermediate element and/or the locking device and in the released position projects visibly out of the housing of the wrench. An acoustic signal is simultaneously produced by the impact of the bolt against the housing wall, by means of which the reaching of the yield point of the bolt to be tightened is indicated. The bolt may be arranged preferably parallel to the torque-measuring spring and may possess a smaller spring deflection path than the torque-measuring spring so that the released bolt, during removal of the wrench, reaches behind the intermediate element and during reactuation of the wrench is again stressed automatically by the same. It is advantageously prevented thereby that the mechanic forgets the renewed stressing of the already released bolt since the bolt during the re-use of the wrench, is automatically stressed or cocked again.

In a further advantageous construction of the present invention, a small idle path or play may be provided for the intermediate element after the reversal of the direction of rotation so that the release mechanism does not respond immediately upon reversal of the direction of rotation, but instead upon disappearance of the torque the bolt is retained by the locking lever before the intermediate element releases the bolt and the signal is triggered. This is so as the disappearance of the torque occurs always when the wrench is removed so that by reason of the relative movement between the transmitting elements, the intermediate member releases the bolt. However, the bolt is secured against the release by the additional locking device.

It is appropriate if the wrench is constructed as articulated lever which consists of two lever parts of unequal lengths, i.e., of the holder part and of the handle part, which are rotatably connected with each other in a joint, and in that the outwardly directed articulated or pivotal movement is limited by an abutment bolt. The holder may thereby receive at its end opposite the joint a cam disk which is constructed as spiral template and a guide bolt for the socket die.

According to a further advantageous feature of the present invention, the cam disk may be fixedly supported by way of an abutment bolt at a mounting device for the wrench, the work piece or the like and may be pressed by means of a leg spring or spring clip, adjustable by means of an adjusting ring, against the abutment and upon lifting of the wrench may be rotated back again into the starting position relative to the transmitting element of the angular rotation measuring device. According to an appropriate type of construction of the socket wrench, the handle lever may with its end surround the holder fork-like, and the two fork legs may be constructed as housing walls for the accommodation of the release mechanism. The torque-measuring spring adapted to be adjusted by means of an adjusting screw may be arranged advantageously in the handle portion of the handle lever and may be supported at the holder by way of a pressure bolt and a pressure plate. According to a very advantageous feature of the present invention, the transmitting element of the angular rotation measuring device arranged in the handle portion parallelly to the pressure bolt and radially to the screw axis may be constructed preferably as toothed rack. The toothed rack can be supported at the handle housing by means of a compression spring and may abut with its one end against the outer flank of the cam disk so that the toothed rack during a rotary movement of the wrench about the screw axis carries out a radial movement with respect to the screw axis corresponding to the spiral shape of the cam disk. A pin engaging in a groove of the toothed rack and secured in the handle lever is appropriately provided for limiting the movement.

It is advantageous if the intermediate element is pivotally supported on a pin mounted in the housing walls and is provided with a feeler finger that projects through a cut-out provided in the handle wall and is able to engage into the teeth of the toothed rack. The feeler finger can be retained in the normal position advantageously by two leaf springs so that it assumes a perpendicular position to the toothed rack axis whereby the intermediate element serves as locking means for the bolt prestressed by a spring. The bolt can be supported in the housing parallel to the toothed rack and may be guided with its one end in a pocket of the holder and with the other marked end may project visibly out of the housing in the released position.

In order that the mechanic cannot continue to rotate the wrench up to into the yield point range, it may also be appropriate if a locking device is provided which is actuated by the release mechanism upon reaching the yield point of the bolt or the like and the further continued rotation of the socket wrench or screw spanner is prevented thereby. It is also very advantageous if a punch or die arranged in the wrench is provided which is actuatable by the release mechanism and impresses a control mark into the bolt head or the like. It is prevented thereby that the mechanic forgets the tightening of one of the bolts, and it can be readily ascertained also later on whether a bolt has been tightened up to the yield point range.

These and further objects, features and advantages of the present invention will become more obvious from the following description when taken in connection with the accompanying drawing which shows, for purposes of illustration only, one embodiment in accordance with the present invention, and wherein:

FIG. 4 is a top plan view of the wrench according to FIG. 3, shown partially in cross-section;

FIG. 5 is a cross-sectional view through the wrench taken along line V—V of FIG. 4;

FIG. 6 is a cross-sectional view, on an enlarged scale, taken along line VI–VI of FIG. 4; and FIG. 7 is a cross-sectional view, on an enlarged scale, through the wrench taken along line VII—VII of FIG. 4.

Figure 1:
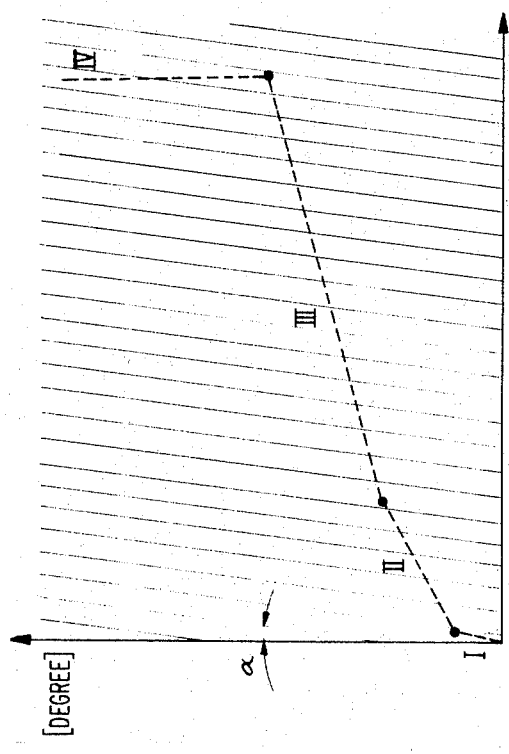
FIG. 1 is a strain diagram of a screw thread.

Referring now to the drawing wherein like reference numerals are used throughout the various views to designate like parts, and more particularly to FIG. 1, the strain diagram of a bolt is illustrated in this figure. The angle of rotation of the bolt in degress is plotted along the ordinate and the tightening torque in mkp is plotted along the abscissa. Four sections are clearly recognizable from the curve of this figure. Within the area I, in which the bolt can be readily screwed-in by hand, the angle of rotation increases steeply without significant increase in the torque. The range II indicates the portion of the curve in which the torque increases more strongly because the threaded connection begins to set. If the work piece is very rigid and inflexible, then the range III indicates practically the elastic spring characteristic of the screw or bolt. This range extends up to the yield point of the screw or bolt whereby upon exceeding the same, the deformation or plastic flow process IV begins.

If one now draws-in parallel lines, which may correspond, for example, to the tooth heads of a toothed rack, at the same distance and with a small inclination α into the diagram and if one guides a feeler finger along the strain curve through the ranges I, II, III and IV, then one can recognize that the feeler finger progresses toward the right in the ranges I, II, and III whereas a reversal of movement takes place within the area IV, i.e., upon attaining the yield point of the screw and the feeler finger is moved toward the left. The reversal of movement of the feeler finger becomes the stronger the greater one chooses the inclination α of the parallel lines.

This reversal movement of the feeler finger is utilized according to the present invention for the release of a signal whereby the reaching of the yield point of the screw or bolt is indicated.

Figure 2:
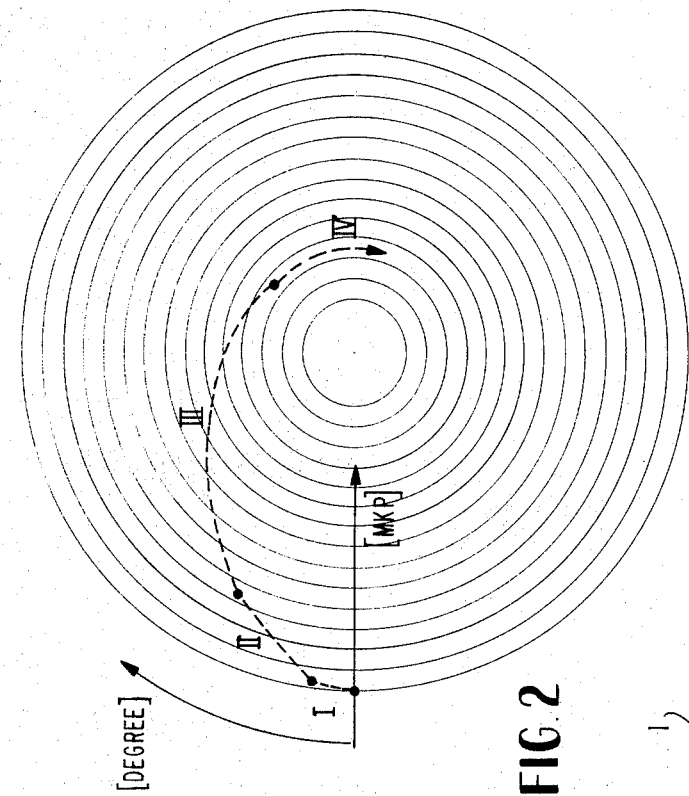
FIG. 2 is the strain diagram of the screw according to FIG. 1 in polar coordinates.

In FIG. 2, the strain diagram is indicated in polar coordinates. The rotary movement of the wrench then indicates directly the angle of rotation without conversion. The torque of the wrench is measured with the aid of the spring-loaded articulated lever and is plotted radially in the polar diagram. The grooves of the disk extend as spirals with gentle slope similar to a phonograph record. In FIG. 2, the spirals with gentle slope are represented in a simplified manner as concentric circles. If one thinks of the circular groove plate as covered, whereby only the feeler finger projects through a small window, then the section of the grooved plate, which is still visible through the window, looks like a toothed rack which continues to move slowly radially during further rotation of the wrench. The wrench is now so constructed correspondingly that a toothed rack extending in the lever arm of the wrench is pressed against the stationary spiral disk by a spring so that the rotary movement of the wrench is converted into a radial movement of the toothed rack. The feeler finger is seated in the lever arm of the wrench. It extends transversely over the teeth of the toothed rack. The change in the direction of movement of the feeler finger is thereby utilized for the triggering or release of the signal.

Figure 3:
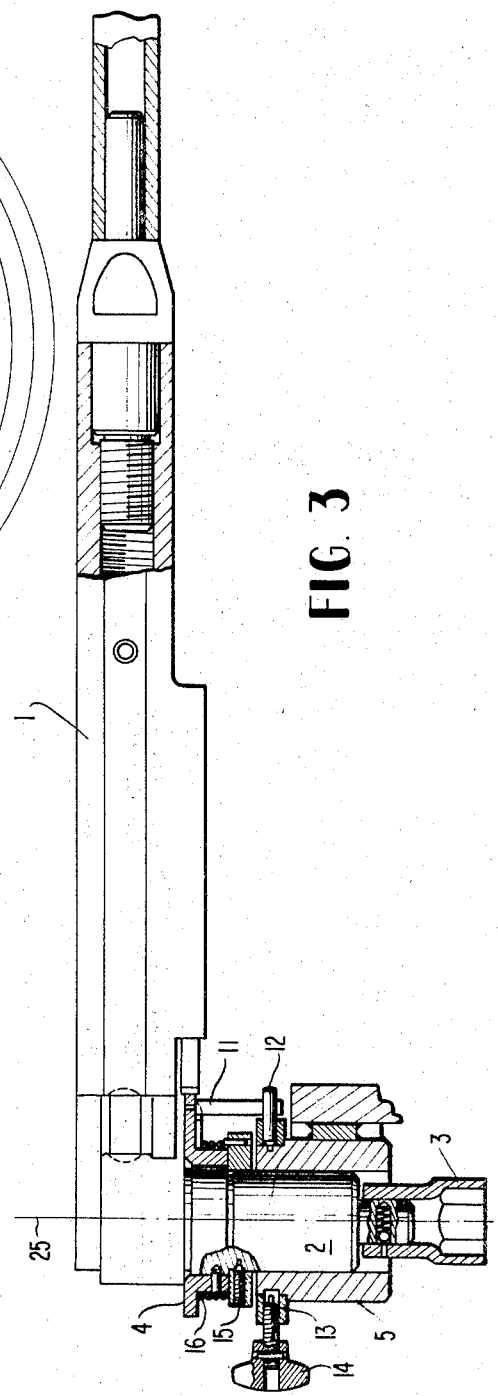
FIG. 3 is a socket wrench according to the present invention inserted into a mechanism of the present invention.

The socket wrench 1 can be recognized in FIG. 3 in a side view thereof. The cam disk 4 can be recognized at the socket mechanism 2 which receives the socket 3. With one-armed wrenches for high torques, the socket mechanism 2 is appropriately guided in the mounting mechanism 5 in order that the wrench cannot slide off during the application of the torque. The individual parts of the socket wrench 1 can be seen from FIG. 4. The socket wrench 1 is constructed as articulated lever which consists of two lever parts of unequal lengths, i.e., the holder 6 and the shank or handle part 7 which are rotatably connected with each other in a joint 8. In order to limit the outwardly directed pivot movement of the wrench, an abutment bolt 9 is provided. The holder 6 accommodates at its end 10 opposite the joint 8 the cam disk 4 which is constructed as spiral template of relatively gentle slope and the guide bolt 2 for the socket 3 (FIG. 3). It can be recognized in FIG. 3 that the cam disk 4 is fixedly supported by way of an abutment bolt 11 at a further bolt 12 of a ring 13 which, for example, is guided on the guide sleeve of the mounting mechanism 5 by means of a lock nut 14, and is pressed by means of a leg spring 16 adjustable with the aid of an adjusting ring 15 by way of the bolt 11 against the abutment 12. The contour of the cam disk can be seen from FIG. 4. During removal of the wrench, the cam disk 4 is turned back again into the starting position illustrated in FIG. 4 relative to the toothed rack 26 by the leg spring 16.

FIG. 4 also illustrates that the shank or handle lever 7 with its one end 17 surrounds the holder 6 fork-shaped and the two fork legs, of which only the lower leg 18 is shown, are constructed as housing walls for the accommodation of the release mechanism generally designated by reference numeral 20. A torque-measuring spring 22 adjustable by means of an adjusting screw 21 is arranged in the handle portion 7 of the handle lever which is supported at the holder 6 by way of a pressure bolt 23 and a pressure plate 24. A transmitting element constructed as toothed rack 26 is arranged in the handle portion 7 parallelly to the pressure bolt 23 and radially to the bolt axis 25. The toothed rack 26 is supported at the handle housing by means of a compression spring 27 and is guided with its one end within the handle housing of the handle portion 7. With its other end, the toothed rack 26 abuts against the cam disk 4 and remains in constant contact with the outer flank of the cam disk 4 during the rotary movement of the wrench by reason of the spring force of the compression spring 27. A pin 29 supported in the handle housing of the handle portion 7 is provided for the limitation of the movement of the toothed rack 26 within a groove 28 of the toothed rack 26.

It can be seen from FIG. 5 that a transmitting element constructed as feeler finger 31 is pivotally supported on a pin 30 mounted in the housing walls 18, which feeler finger projects through an opening 32 provided in the shank or housing wall and engages into the teeth of the toothed rack 26. The feeler finger 31 is connected with an angularly bent layer 33, which is also supported on the pin 30, by way of a pin 34 and in the normal position is retained by two leaf springs vertically disposed and more particularly by a lower leaf spring 35 and an upper leaf spring 36 which are arranged offset to one another. The angularly bent lever 33 serves as locking means for a striker pin 38 prestressed by a spring 37 (FIG. 5). The marked end of the striker pin 38 projects in the outwardly spring-deflected condition out of the housing and is visible. With its other end 39, the striker pin 38 is supported in a pocket 40 of the holder 6 by means of a bolt 41. It is guided within the housing part 42.

A locking lever 43 shown in its open condition in FIG. 4, is provided as further locking means which in the closed condition engages with its nose portion 45 behind the the shoulder of striker pin 38. The lever 43 is slotted at the other end and is clamped onto the shaft 44 with a slip movement adjustable by the screw 49 and the cup spring 50 (FIG. 7).

The shaft 44 is supported in the housing 42. The bracket 46 is securely seated on the shaft 44 which is operatively connected with the pin 39 by way of a coupler 47 of any conventional construction.

As the wrench, during tightening of the screw thread, pivots inwardly about the point of rotation 8, then the locking lever 43 is opened thereby until it abuts at the pin 48. During the further inward pivotal deflection of the wrench, the shaft 44 in contact with pin 48, slips in the locking lever 43. However, if the wrench again pivots outwardly in the opposite direction, then the lever is returned immediately and stops against the shoulder of the striker pin 38.

OPERATION

The operation of the socket wrench in accordance with the present invention is as follows:

At first the torque-measuring spring 22 is so prestressed by means of the adjusting screw 21 that the adjusted torque lies somewhat below all deformation or yielding moments to be expected. This adjustment need not be changed any more.

For tightening of a bolt, the wrench 1 is now so inserted into the guide sleeve 5 of the support mechanism that the socket 3 surrounds the head of the bolt (not illustrated). If one now tightens the bolt within the range I (see FIGS. 1 and 2), then the articulated lever 6, 7 does not pivot since the screw-tightening torque is smaller than the moment adjusted at the torque-measuring spring 22.

While the wrench is rotated, the cam disk 4 remains stationary so that the toothed rack 26 sliding along the cam disk 4 moves radially to the screw axis 25. As a result of this movement, each tooth of rack 26 pivots the feeler finger 31 a small distance in the clockwise direction.

It thereby also pivots by way of the pins 30 34 the locking lever 33 so that it releases the prestressed striker pin 38. However, the striker pin 38 does not jump out of the housing because it is retained by the additional locking lever 43.

If the toothed rack 26 now slides along further in the direction of the bolt axis, then the feeler finger 31 slides off from the head of the tooth of tooth rack 26 pivoting the same and as a result of the effect of the leaf springs 35 and 36 snap the lever 33 back into its center position thereby causing the lever 33 to reengage the striker pin 38.

This operation repeats itself continuously from tooth to tooth as long as the bolt-tightening moment does not exceed the adjusted moment at the torque measuring spring 22. As soon as this is the case, the articulated lever 67 begins to pivot inwardly. Hence, the shank or handle lever 7 approaches radially the bolt axis 25. As a result of this movement, the locking lever 43, is due to rotation of shaft 44, is and remains opened with increasing torque.

If the screw thread is further tightened, then the toothed rack 26 as also the handle lever 7 both approach the bolt axis 25 in parallel and in the same direction. Since the radial component of motion of the toothed rack 26 is in evry case smaller than the radial component of motion of the handle lever 7 due to the flat or gentle pitch of the cam disk 4, the feeler finger 31 sensing the relative movement of the two parts only carries out deflection movements in the counterclockwise direction. The striker pin 38 is not released by this movement since the locking lever 43 is still in engagement with a shoulder of the pin 38.

If the screw reaches the yield point, i.e., the range IV of the curve in FIGS. 1 and 2, then the torque or nearly completely notwithstanding torque increase stops completely further increase in the angle of rotation. This means that the lever 7 no longer moves in the direction of the screw axis 25 but only the toothed rack 26 still does so. The teeth of the toothed rack 26 pivot the feeler finger 31 in the clockwise direction, and the feeler finger 31 opens the locking lever 33. Since at this point the locking lever 43 is open (FIG. 4) the prestressed striker pin 38 with its marked end visibly and audibly snaps out of the housing 18 as a signal that the yield point has been reached.

The additional stamping mechanism which may be provided in the plug-type socket and which, with a releasing signal stamps on the bolt head a control mark, is not illustrated in detail in the drawing for the sake of simplicity since such stamping or punching mechanism may be of any conventional construction.

while we have shown and described only one embodiment in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A torque wrench for tightening highly stressed threaded elements comprising, a wrench housing, means for measuring torque, means for measuring angular rotation, means for transmitting the angular rotation secured at said measuring means, means for signaling a predetermined torque, intermediate means rotatably supported in said housing and operatively connected to said transmitting means, means for releasing said signal means, said transmitting means being movable substantially in the same direction with an increasing angle of rotation in the thread-tightening direction, said intermediate means locking said release means by the relative movement of the transmitting means in one direction and with a reversal of the direction of rotation releasing said signal means by way of said release means.

2. A wrench according to claim 1, characterized in that said transmitting means are movable substantially parallel to one another.

3. A wrench according to claim 2, wherein said torque measuring means includes a prestressed torque-measuring spring and wherein further locking means is provided for said release means operatively connected with said torque-measuring spring, said locking means opens when the prestressed torque-measuring spring means spring-deflects inwardly and closes when the torque-measuring spring means spring-deflects outwardly.

4. A wrench according to claim 3, wherein said further locking means is constructed as lever which is actuatable from a shaft by way of a slip clutch and abutment means are provided for limiting the opening angle to the smallest possible extent necessary for the release of said further locking means of said release means.

5. A wrench according to claim 4, wherein said release means includes a bolt prestressed by a spring, said spring, in the stressed condition, being secured by at least one of the two parts consisting of the intermediate means and the further locking means and said bolt in the released position visibly snaps out of the housing of the wrench.

6. A wrench according to claim 5, wherein said bolt is arranged substantially parallel to said torque-measuring spring and possesses a smaller spring deflection path in the spring release direction than the torque-measuring spring so that the released bolt during removal of the wrench extends behind said intermediate means and is automatically stressed again by the latter during reactuation of the wrench.

7. A wrench according to claim 6, wherein a smaller idling path is provided for the intermediate means after reversal of direction of rotation so that the release means is not released immediately upon reversal of direction of rotation of said intermediate means but the bolt is retained by the further locking means until said predetermined torque is achieved.

8. A wrench according to claim 7, wherein the wrench is constructed as articulated lever which consists of two lever parts of unequal length constituting a holder and a handle, said holder and handle being rotatably connected with each other by a joint, and wherein abutment means are provided for limiting the pivotal movement thereof in the outward direction.

9. A wrench according to claim 8, further comprising a cam disk mounted in said holder at its end opposite said joint, said guide bolt means for a socket die, said cam disk being constructed as spiral template.

10. A wrench according to claim 9, further comprising means for fixedly supporting said cam disk in said holder, leg spring means for pressing said cam disk against an abutment in said holder, means for adjusting said leg spring means whereby said cam disk is rotated back into its normal position relative to the transmitting means of the angular rotation measuring means during removal of the wrench.

11. A wrench according to claim 10, wherein said holder is forked-shaped and the two fork leg portions thereof are constructed as housing wall surrounding the end of the handle and accommodating said release means.

12. A wrench according to claim 11, further comprising an adjusting screw for said torque-measuring spring arranged in the handle and supported at the holder by way of a pressure bolt and a pressure plate.

13. A wrench according to claim 12, wherein said transmitting means is a toothed rack arranged in the handle means substantially parallel to said pressure bolt and substantially radially to the axis of the threaded element.

14. A wrench according to claim 13, further comprising a compression spring in said handle supporting said toothed rack, one of said toothed rack abuts against the outer flank of the cam disk, a groove in said toothed rack and a means for limiting the movement of said toothed rack engageable in said groove and secured in the handle.

15. A wrench according to claim 14, further comprising a pin mounted in housing walls pivotally supporting said intermediate means and a feeler finger projecting through an opening in the handle engageable with the teeth of the toothed rack.

16. A wrench according to claim 15, further comprising spring means for retaining said feeler finger in a normal position whereby the intermediate means serves as locking means for said bolt.

17. A wrench according to claim 16, wherein said feeler finger is retained in its normal position by two spring means.

18. A wrench according to claim 16, further comprising a pocket in said holder, one end of said bolt being guided therein and other end projecting visibly out of the housing in the released position.

19. A wrench according to claim 18, wherein a means, actuated by the release means upon reaching the yield point of the threaded element, is provided for preventing the further rotation of the wrench.

20. A wrench according to claim 19, characterized in that a stamping means is provided in the wrench which is actuated by the release means and impresses a control mark in the bolt head.

21. A wrench according to claim 20, characterized in that said transmitting means are movable substantially parallel to one another.

22. A wrench according to claim 1, wherein said torque measuring means includes a prestressed torque-measuring spring and wherein further locking means is provided for said release means operatively connected with said torque-measuring spring, said locking means opens when the prestressed torque-measuring spring means spring-deflects inwardly and closes when the torque-measuring spring means spring-deflects outwardly.

23. A wrench according to claim 22, wherein said further locking means is constructed as lever which is actuatable from a shaft by way of a slip clutch and abutment means are provided for limiting the opening angle of said further locking means to the smallest possible extent necessary for the release of said release means.

24. A wrench according to claim 1, wherein the release means includes a bolt prestressed by a spring, said spring, in the stressed condition, being secured by at least one of the two parts consisting of the intermediate means and a further locking means and said bolt in the released position visibly snaps out of the housing of the wrench.

25. A wrench according to claim 24, wherein the bolt is arranged substantially parallel to said torque-measuring spring and possesses a smaller spring deflection path in the spring release direction than the torque-measuring spring so that the released bolt during removal of the wrench extends behind the intermediate means and is automatically stressed again by said latter during reactuation of the wrench.

26. A wrench according to claim 24, wherein a smaller idling path is provided for the intermediate means after reversal of direction of rotation so that the release means is not released immediately upon reversal of direction of rotation of said intermediate means, but the bolt is retained by the further locking means until said predetermined torque is achieved.

27. A wrench according to claim 1, wherein the wrench is constructed as articulated lever which consists of two lever parts of unequal length constituting a holder and a handle, said holder and handle being rotatably connected with each other by a joint, and wherein abutment means are provided for limiting the pivotal movement thereof is in the outward direction.

28. A wrench according to claim 27 further comprising a cam disk mounted in said holder at its end opposite said joint, and guide bolt means for a socket die, said cam disk being constructed as spiral template.

29. A wrench according to claim 28, further comprising means for fixedly supporting said cam disk in said holder, leg spring means for pressing said cam disk against an abutment in said holder, means for adjusting sid leg spring means whereby said cam disk is rotated back into its normal position relative to the transmitting means of the angular rotation measuring means during removal of the wrench.

30. A wrench according to claim 27, wherein said holder is fork-shaped and the two fork leg portions thereof are constructed as housing surrounding the end of the handle and accommodating said release means.

31. A wrench according to claim 24, further comprising an adjusting screw for said torque-measuring spring arranged in the handle and supported at the holder by way of a pressure bolt and a pressure plate.

32. A wrench according to claim 27 wherein said transmitting means is constructed as toothed rack.

33. A wrench according to claim 32, further comprising a compression spring in said handle supporting said toothed rack, one end of said tooth rack abuts against the outer flank of the cam disk, a groove in said toothed rack and a means for limiting the movement of said toothed rack engageable in said groove and secured in the handle.

34. A wrench according to claim 32, further comprising a pin mounted in housing walls pivotally supporting said intermediate means and a feeler finger projecting through an opening in the handle wall engageable with the teeth of the toothed rack.

35. A wrench according to claim 34, further comprising spring means for retaining said feeler finger in a normal position whereby the intermediate means serves as locking means for said bolt.

36. A wrench according to claim 35, wherein said feeler finger is retained in its normal position by two spring means.

37. A wrench according to claim 27, further comprising a pocket in said holder one end of said bolt being guided therein and the other end projecting visibly out of the housing in the released position.

38. A wrench according to claim 1, wherein a means, actuated by the release means upon reaching the yield point of the threaded element is provided for preventing the further rotation of the wrench.

39. A wrench according to claim 1, wherein a stamping means is provided in the wrench which is actuated by the release means and impresses a control mark in the bolt head.

* * * * *